Aug. 4, 1970     E. WILDHABER     3,522,714
UNIVERSAL JOINT

Filed June 11, 1968     2 Sheets-Sheet 1

INVENTOR:
Ernest Wildhaber

Aug. 4, 1970     E. WILDHABER     3,522,714
UNIVERSAL JOINT

Filed June 11, 1968     2 Sheets-Sheet 2

INVENTOR:
Ernest Wildhaber

United States Patent Office 3,522,714
Patented Aug. 4, 1970

---

3,522,714
UNIVERSAL JOINT
Ernest Wildhaber, Brighton, N.Y.
(124 Summit Drive, Rochester, N.Y. 14620)
Filed June 11, 1968, Ser. No. 736,185
Int. Cl. F16d 3/34
U.S. Cl. 64—21                                13 Claims

ABSTRACT OF THE DISCLOSURE

This constant velocity universal joint comprises an outer member and an inner member both having straight ways extending parallel to their respective axis. Balls engage the ways of both members to operatively connect them. Each ball is guided by an individual block slidable without turning along the way of preferably the outer member. And control means are provided that act on said blocks to keep the balls in the plane bisecting the angle between the intersecting axes of said two members. The invention also provides novel control means.

---

The present invention relates to universal joints known as constant-velocity universal joints.

One object is to simplify the design, to make it more rigid. A further object is to lower the cost of accurate production. A still other aim is to achieve a more nearly uniform motion transmission than in known constant-velocity universal joints that use more than three driving balls. Even moderate departure from uniform motion confines the load to fewer balls. Thus transmission of more nearly uniform motion also increases the load capacity of the joint. Other aims will appear in the course of the specification and in the recital of the appended claims.

Figure 1:
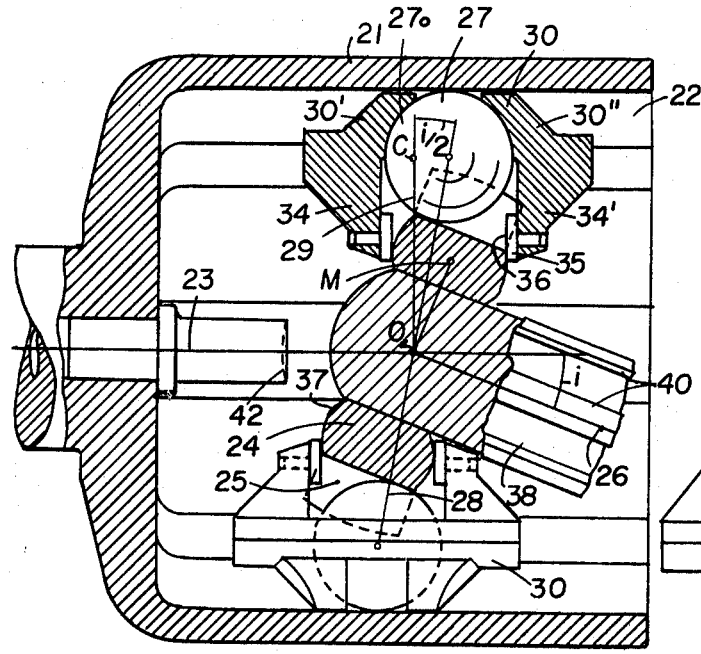
FIG. 1 is a section laid through the axes of the two members connected by the joint, illustrative of one embodiment of the invention. It shows the joint at an angle and shows one part in side view.
Figure 3:
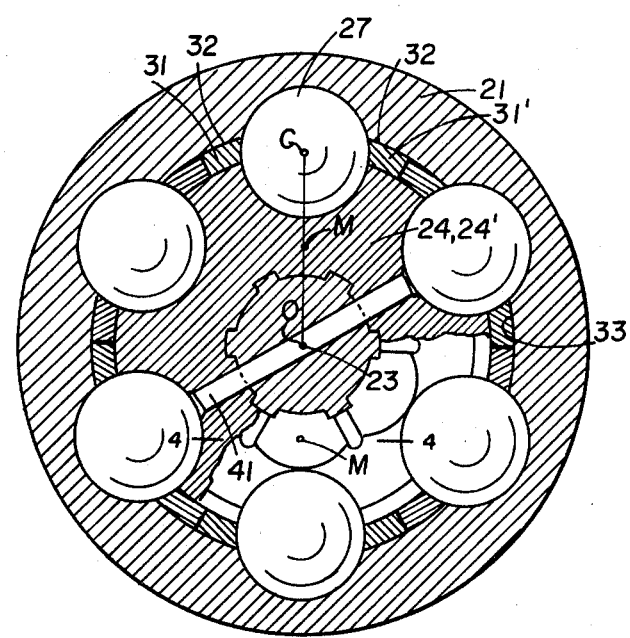
FIG. 3 is a cross-section through center O of both FIGS. 1 and 2, with the two members of the joint shown in alignment.

The embodiment illustrated in FIGS. 1 and 3 comprises an outer member 21 having ways 22 internally provided thereon and spaced about its axis 23, and an inner member 24 having ways 25 provided on its outside and spaced about its axis 26. The two members are shown at an angularity $i$ of their axes that intersect at joint center O. The ways 22, 25 of both members are straight and parallel to the axis of the respective member. Balls 27 engage the ways of the two members to operatively connect them. To transmit constant velocity the ball centers should be kept in a plane 28 that bisects the angle between the two axes 23, 26, and that may be referred to as the bisector plane. It is inclined at an angle of $\frac{1}{2}i$ to a plane 29 perpendicular to axis 23. The balls are maintained in said plane by individual blocks 30 that are slidable along the ways 22 of the outer member 21. Each block 30 comprises two halves 30′, 30″ disposed on axially opposite sides of their ball 27. They are connected through a pair of arm portions 31, 31′ on peripherally opposite sides of the ball (FIG. 3). The blocks are guided by engagement of their cylindrical outer surfaces 32 with the cylindrical inside surface 33 of the outer member, and by engagement with the straight way itself and with the ball. Thus the blocks are kept in angular alignment with the outer member and do not tilt relatively thereto. Block 30 fits its ball 27 on opposite sides of the outer ball hemisphere $27_0$. This is close-fitting contact, much improved over the ball contact in conventional cages.

Each block 30 contains a pair of inward projections 34, 34′ that reach ot the opposite sides of the inner member, to receive motion therefrom. In the embodiment of FIG. 1 the projections 34, 34′ carry a pair of disks 35 that may turn on their projecting pins mounted in said projections. Disks 35 have a plane face 36 perpendicular to their pins and to axis 23 of the outer member. The surface portion engaged by face 36 has a convex profile 37. It is such that tilting of the inner member through any angle $i$ in the drawing plane of FIG. 1 displaces the block 30 a distance $R \tan (\frac{1}{2}i)$, where R denotes the distance of the ball centers from axis 23. The surface portion itself is part of a surface of revolution with radial axis OM perpendicular to axis 26 of the inner member. Such a surface permits angular displacement of member 24 from alignment position about a radial axis OC passing through the ball center (FIG. 3), without displacing the ball center. It is seen that the balls are in the required position when one member is tilted from alignment position about axis OC (FIG. 3), and also when it is tilted about an axis through O perpendicular thereto.

When tilted about any other axis of the drawing plane of FIG. 3 the required ball position is attained in close approximation, as can be demonstrated mathematically.

At zero and quite small angles $i$ plane 36 contacts profile 37 at points whose normals intersect line OC halfway between O and C, at a point that coincides with M at zero angle $i$. This is because for quite small angles $R \tan (\frac{1}{2}i)$ is practically equal to $\frac{1}{2}R$ arc $i$.

Figure 7:
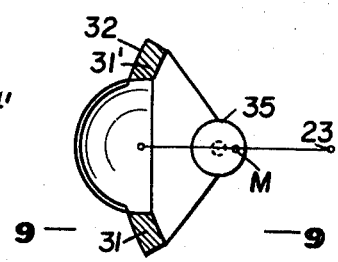
FIG. 7 is a section along lines 7—7 of FIG. 6.

It should be noted that the turning axis of disk 35 has a distance from axis 23 larger than one half the distance R of the path of the ball center from axis 23 (FIG. 7). This disposition minimizes wear at small angles $i$.

Block 30 may be made of metal or for instance of nylon.

Member 24 is connected with a shaft 38 through splines 40 and may be axially fixed thereto by a pin 41 (FIG. 3). Member 24 can adjust itself along axis 23. A stop 42 secured to member 21 sets a limit to such axial displacement.

Figure 4:
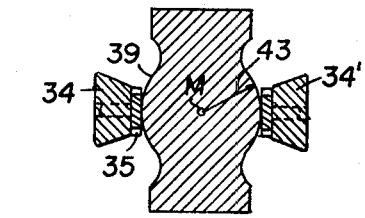
FIG. 4 is a section taken along lines 4—4 of FIG. 3 through point M, at right angles to radius OM. It refers to the embodiment of FIG. 1.
Figure 6:
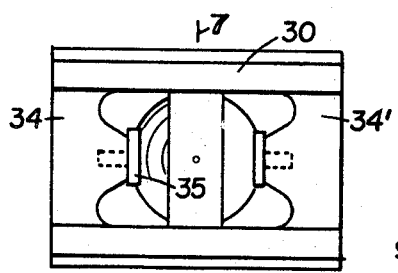
FIG. 6 is a view of a block 30 taken from axis 23 (FIG. 1) outwardly in radial direction.

FIG. 4 is a section perpendicular to radius OM. It shows up a pair of opposite side-surface portions of the inner member 24. They are parts of the same surface of revolution 39 whose axis OM is radial of axis 26. 43 denotes the radius in this section. Each block 30 engages its own surface of revolution on opposite sides of member 24. Block 30 is further shown in FIGS. 6 and 7. Known seals are provided but not shown.

Figure 2:
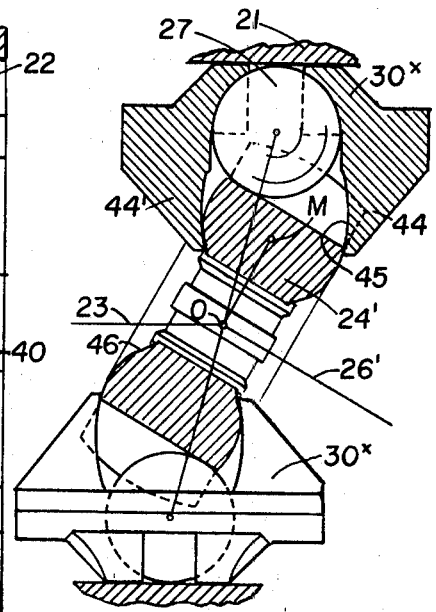
FIG. 2 is an axial section similar to FIG. 1 showing a modification.

In the embodiment of FIG. 2 the inward projections 44, 44' of block 30ˣ have a concavely curved profile 45. Here said projections directly contact the sides of the inner member 24', which again are portions of surfaces of revolution with radial axes. The profile 46 of said surfaces is such that an angular displacement $i$ about the joint center O, in the drawing plane, produces a block displacement of $R \tan (½i)$.

The mean inclination of profile 45 to the direction radial of axis 23 is referred to as the average pressure angle. It is kept between positive five degrees and negative ten degrees, while uniform motion gears have only positive pressure angles.

Figure 5:
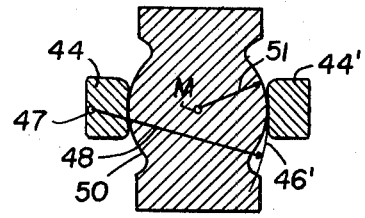
FIG. 5 is the same section as applied to the embodiment of FIG. 2.

As shown in FIG. 5 the projections 44, 44' have a concave profile 46' also in peripheral direction. It may be a circular arc. 47 denotes its center of curvature. The curvature radius 48 is generally kept larger than the diameter of the surface of revolution 50, whose radius is shown at 51. The said surface of revolution has an axis OM perpendicular to the axis 26' of the inner member.

The concave profile 46' provides a still closer approximation. One way of determining it is to represent the surface of revolution 50 with a rotating milling cutter and to effect the known relative motions between the inner member and the block for a shaft angularity near the design limit. Gearing may be used to attain transmission of uniform motion in this process.

The outer member may be identical with outer member 21 of FIG. 1.

Figure 8:
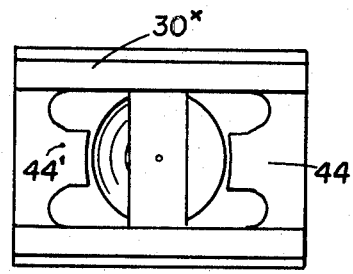
FIG. 8 is a radial view of block $30^x$ of FIG. 2.

Block 30ˣ is further shown in FIG. 8.

More broadly, the blocks may be slidable along the ways of one member, either the outer or the inner member. Each block carries two portions engaging mating portions of the other member, whereby two portions (50 in FIG. 5) face away from each other and are straddled by the mating portions (44, 44'). The first-named two portions (50) are parts of a single surface of revolution with radial axis (OM). Their working profile (46) is increasingly curved with decreasing distance from the axis (25') of the member that carries it. The peripheral profile (46') is concavely curved, more curved than the peripheral profile of a surface of revolution with the same working profile and that is coaxial with the member (21) that carries it.

Figure 9:
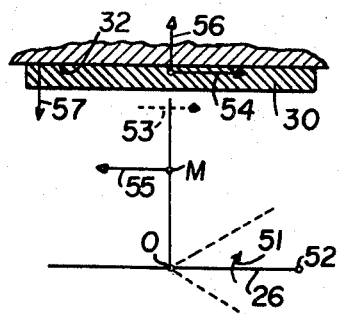
FIG. 9 is a diagrammatic section taken along lines 9—9 of FIG. 7, showing the forces acting upon the block.
Figure 10:
FIG. 10 is the same section showing with exaggeration the tilted position of the block in the mean position of its path, driving load being applied by the inner member.

Diagram FIG. 9 is a section taken along lines 9—9 of FIG. 7. It shows the forces acting on block 30 (or 30ˣ) midway of its travel, with the inner member driving in the direction of arrow 51 and its axis 26 tilted up at the right of O, so that its point 52 is above the drawing plane. The block then moves to the right, along arrow 53, and the ball exerts a force component 54 on the block. It is balanced by an equal force 55 exerted on the left inward projection of the block. Because of the distance of the forces 54 and 55 from each other, these forces exert also a turning moment or couple on the block. It is held in equilibrium by a couple made up of an upward force component 56 exerted by the ball on the block and by an equal downward force 57 exerted on surfaces 32 by the outer member. FIG. 10 shows the effect of this couple. Block 30 is tilted very slightly, as shown with exaggeration. A wedge 58 is formed that favors lubrication.

Figure 11:
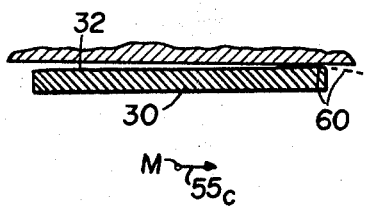
FIG. 11 is a similar section for coasting, the block moving to the right.

FIG. 11 illustrates the same position and the same motion, but with the inner member coasting. It is being driven by the outer member. Here the driving forces are reversed. Force 55꜀ takes the place of force 55. The block is then tilted in the opposite direction, while moving to the right. If desired, its surface 32 may be eased off adjacent the ends, as with a circular arc whose extension is shown at 60, to help lubrication.

Figure 12:
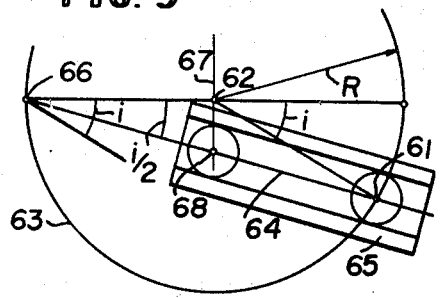
FIG. 12 is a diagram explanatory of the displacement of a block in dependence of the shaft angularity of the joint.

Diagram FIG. 12 further illustrates the relation between the block displacement and angle $i$, in the drawing plane of FIGS. 1 and 2. Pin center 61 turns about a center 62 through various angles $i$ and describes a circle 63 with radius R. The pin engages a straight radial way 64 of a member 65 pivoted at 66 on circle 63 and turns member 65 through ½$i$. Way 64 is engaged by a second pin constrained to move in a straight path 67 perpendicular to line 62–66. The distance 62–68 of its center 68 from center 62 equals the required block displacement from its central position.

An inexpensive way of finishing the side surfaces (39, 50) of the inner member is by cold-pressing or coining.

THE BALLS

Figure 13:
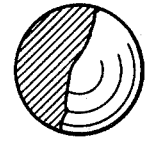
FIGS. 13, 14 and 15 are views and fragmentary sections of various ball constructions for constant-velocity universal joints.

The joint can be operated with various kinds of balls. FIG. 13 illustrates the standard solid ball, usually made of hardened steel or alloy, of a material of great strength and rigidity, the latter being characterized by a large modulus of elasticity.

A solid ball for use in a universal joint can also be made of non-metal, of a strong material of much lower modulus of elasticity than that of the standard ball, such as for instance of a Nylon-like material. Due to the greater flexibility the area of contact between such a ball and its way is much enlarged, so that the stresses are lower than on a steel ball, and near the range of its lower stress capacity.

Figure 14:
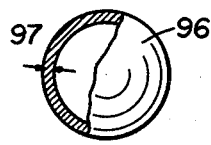

FIG. 14 illustrates a hollow ball 96, preferably made of the same strong material as the standard solid ball. While the solid ball has its largest stress near the area of contact, the hollow ball has a decreased stress there because it is more flexible, so that the area of contact is increased. I may decrease the wall thickness 97 until the stress at the portions further away from the contact region approaches the stress near the contact area. The wall thickness 97 may be kept from two percent up to ten percent of the outside diameter of the ball.

The hollow ball has smaller surface stresses at a given load and less tendency to squeeze out the lubricant than the solid ball. This is an asset in universal joints, because there the balls have sliding in addition to rolling motion. It is a different function than hollow balls have in a bearing, where there is practically no sliding contact. Also the increased deflection is acceptable and often desirable in a universal joint, but much less in a bearing that should provide a rigid mounting.

Figure 15:
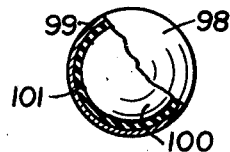

FIG. 15 illustrates a composite ball structure. Ball 98 comprises a thin-walled spherical shell 99 having a thickness from two to ten percent at the most of the outside diameter of ball 98, an inner solid ball 100 of preferably the same high-grade material as shell 99, and a thin spherical layer 101 of yielding, rubber-like material. Layer 101 is bonded to both the shell 99 and to ball 100. This construction increases the area of contact and decreases the surface stresses thereon, without decreasing the load capacity of the joint.

Decreased surface stresses at the contact areas often permit using outer and inner members without hardening and subsequent grinding, members finish-machinable with cutting tools and shaving tools.

The outer shell may be made in two parts bonded together, or of a single part rolled into spherical shape and then finished conventionally.

While the invention has been described with several embodiments thereof, it is capable of further modifications. For definition of its scope it is relied on the appended claims.

I claim:

1. A universal joint comprising an outer member having a plurality of straight internal ways spaced about the axis of said outer member and parallel thereto, an inner member having the same number of straight ways parallel to its axis but provided on its outside, balls engaging the ways of both members to operatively connect them, an individual block for holding each of said balls, said blocks being individually slidable along separate ways of one of said members, each block having two portions engaging mating portions of the other member for maintaining said balls in the bisector plane of the axes of said two members, two of said portions facing away from each other and being straddled by their mating portions, the first-named two portions being parts of a single surface of revolution, whose axis is radial to the axis of one of said members.

2. A universal joint according to claim 1, wherein the working profile of said surface of revolution is increasingly curved with decreasing distance from the axis of the member that carries it, in planes containing the axis of said surface of revolution.

3. A universal joint according to claim 1, wherein the last-named two portions are concavely curved in peripheral direction more than a surface of revolution coaxial with the member that carries them and that has the same working profile.

4. In a constant velocity universal joint according to claim 1, wherein each of said balls comprises a thin-walled spherical shell having a wall thickness between two and ten percent of the outside diameter of said shell.

5. In a constant velocity universal joint, the combination recited in claim 4, wherein said shell is connected with a solid central ball through a spherical layer of rubber-like yielding material bonded to both the shell and to the central ball.

6. A universal joint comprising an outer member having a plurality of straight ways internally provided thereon, said ways being spaced about its axis and being parallel thereto, an inner member having the same number of straight ways parallel to its axis provided on its outside, balls engaging the ways of both members to operatively connect them, an individual block for each of said balls for holding its ball, said blocks being slidable along the ways of said outer member and each containing two halves located on axially opposite sides of their ball, said halves being connected through a pair of separated arm portions that straddle its ball, and means for displacing said blocks to maintain the ball centers in the bisector plane of the axes of said two members.

7. A universal joint according to claim 6, wherein said arm portions have outer surfaces that lie in a cylindrical surface coaxial with the outer member, said surfaces bearing against the cylindrical inside surface of the working part of the other member.

8. A universal joint according to claim 6, wherein each of said blocks has a pair of inward projections for receiving motion from opposite side portions of said inner member.

9. A universal joint according to claim 8, wherein the pair of inward projections of each block contain abutment surfaces for engagement with side-surface portions of the inner member, the profile of said abutment surfaces, in a central plane containing the axis of said outer member, having an average pressure angle between plus five degrees and negative ten degrees.

10. A universal joint according to claim 9, wherein the abutment surfaces are formed on rotatable disks.

11. A universal joint comprising an outer member having a plurality of internal ways,
said ways being spaced about its axis and extending lengthwise at a constant distance therefrom,
an inner member having ways on its outside,
balls engaging the ways of both members and operatively connecting them,
an individual block for holding each ball,
said blocks being individually slidable along the ways of one of said members,
each of said blocks having two surface portions cooperating with two surface portions which are rigid with the other of said two members,
one of said two pairs of surface portions lying, at least approximately, in the same surface of revolution,
the axis of said surface of revolution extending at right angles to the axis of one of said two members.

12. A universal joint according to claim 11, wherein in each set of cooperating surface portions two of the surface portions straddle the other two cooperating surface portions, and
the two surface portions straddled by the cooperating portions are parts of the same surface of revolution,
the axis of said surface of revolution extending radially of the member that carries said straddled portions.

13. A universal joint according to claim 11, wherein in each set of cooperating surface portions, two of the surface portions straddle the cooperating two surface portions, and
the straddled portions have a convex profile while the portions cooperating therewith have a concave profile in sections containing the axis of the member that carries the respective portions.

References Cited

UNITED STATES PATENTS

| | | | |
|---|---|---|---|
| 1,915,654 | 6/1933 | Edmunds | 64—9 X |
| 2,313,279 | 3/1943 | Suczek | 64—21 |
| 2,427,237 | 9/1947 | Suczek | 64—21 |
| 3,001,838 | 9/1961 | Lamson | 308—188 |
| 3,106,077 | 10/1963 | Sharp | 64—21 |
| 3,166,919 | 1/1965 | Kayser | 64—21 |
| 3,204,429 | 9/1965 | Kayser | 64—21 |
| 3,337,278 | 8/1967 | Vigh | 308—188 |
| 3,357,209 | 12/1967 | Mooney | 64—21 |

JAMES A. WONG, Primary Examiner